B. H. DIVINE.
BRAKE SHOE.
APPLICATION FILED JAN. 18, 1912.

1,166,448.

Patented Jan. 4, 1916.
2 SHEETS—SHEET 1.

WITNESSES:
L. G. Snyder.
E. T. DeGiorgi.

INVENTOR
Bradford H. Divine
BY
Henry M. Love
ATTORNEY

B. H. DIVINE.
BRAKE SHOE.
APPLICATION FILED JAN. 18, 1912.

1,166,448.

Patented Jan. 4, 1916.
2 SHEETS—SHEET 2.

WITNESSES:
L. G. Snyder.
E. T. DeGiorgi.

INVENTOR
Bradford H. Divine
BY Henry M. Love
ATTORNEY

UNITED STATES PATENT OFFICE.

BRADFORD H. DIVINE, OF UTICA, NEW YORK.

BRAKE-SHOE.

1,166,448.  Specification of Letters Patent.  Patented Jan. 4, 1916.

Application filed January 18, 1912. Serial No. 671,974.

*To all whom it may concern:*

Be it known that I, BRADFORD H. DIVINE, a citizen of the United States, residing at Utica, in the county of Oneida and State of New York, have invented certain new and useful Improvements in Brake-Shoes, of which the following is a specification, reference being had therein to the accompanying drawing.

This invention relates to certain improvements in brakes and friction surfaces therefor; and the objects and nature of the invention will be readily understood by those skilled in the art in the light of the following explanation of the accompanying drawings illustrating what I now believe to be the preferred embodiment or mechanical expression of my invention from among other formations and arrangements within the spirit and scope thereof.

The invention consists in certain novel features in construction and formation, and in combinations and arrangements as more fully and particularly set forth hereinafter.

Figure 1:
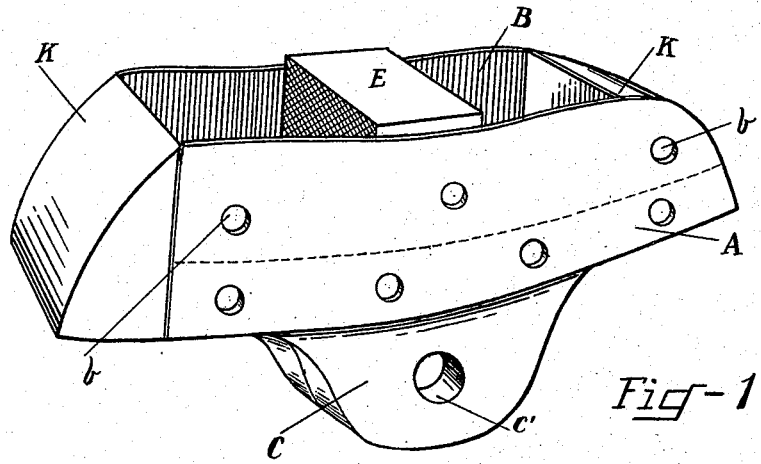
Figure 2:
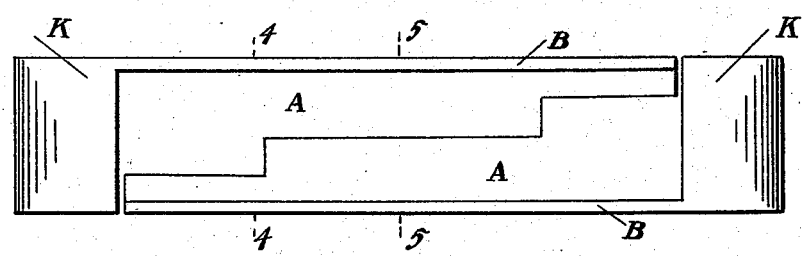
Figure 3:
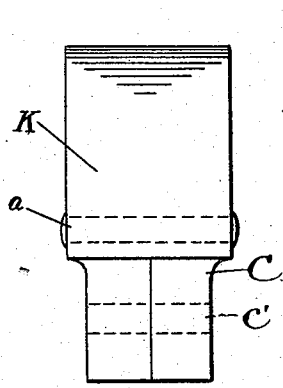
Figure 4:
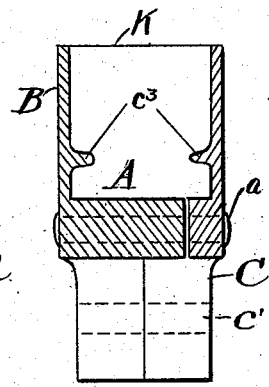
Figure 5:
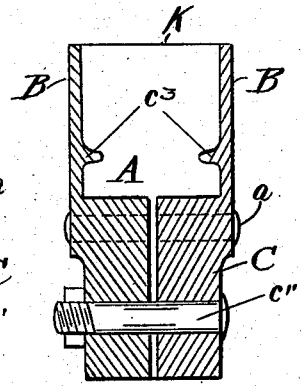
Figure 6:
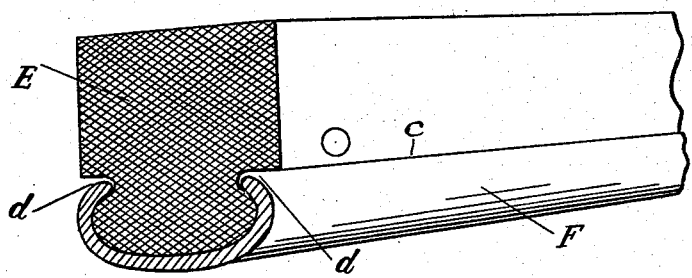
Figure 7:
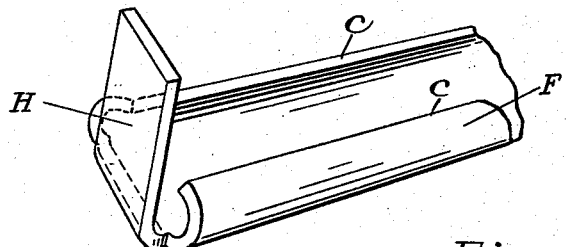
Figure 8:
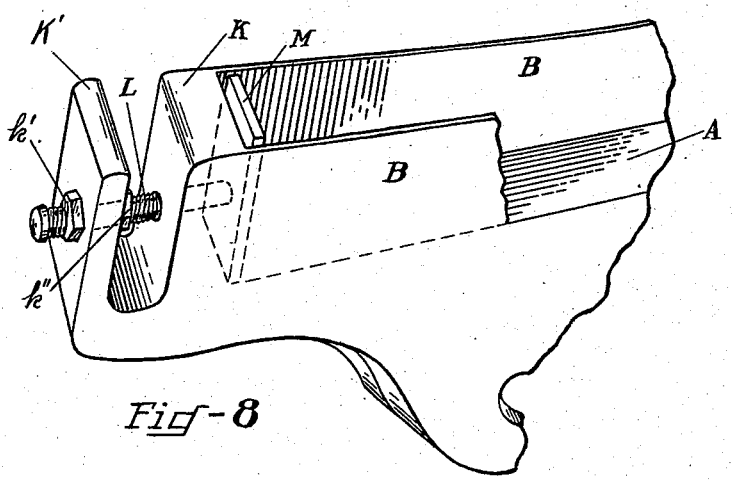

Referring to the accompanying drawings, which are somewhat diagrammatical: Figure 1, is a perspective somewhat diagrammatically illustrating a brake shoe casing or holder and a portion of the friction block or surface to be held thereby and secured therein. Fig. 2, is a plan of the holder or casing, the friction block or surface being removed. Fig. 3, is an end view of the holder of Fig. 1. Fig. 4, is a section on the line 4—4, Fig. 2. Fig. 5, is a section on the line 5—5, Fig. 2. Fig. 6, is a detail perspective of a portion of the friction block or surface and a permanent binder holding the same in compressed form. Fig. 7, is a detail perspective of a portion of the permanent binder of Fig. 6, showing how the ends thereof can be turned up to hold the friction material and to provide bearing faces for the engagement of screws and other clamping or securing means. Fig. 8, is a detail perspective diagrammatically illustrating a modified form of holder or casing.

The essential feature of this invention consists of the peculiar brake or friction block composed of a dense hard mass of threads compressed together and forming a friction or wearing surface of thread ends. This block is formed by placing a plurality of pieces or plies of woven fabric, such as canvas, side by side or together in parallelism, and then subjecting the same to such great pressure as to compress the material into a hard compact mass. The pieces of fabric are cut on the bias so that the woven threads will be arranged diagonally, as indicated by the cross lines on the friction block E, Figs. 1 and 6, so that the friction or wearing surface of the dense compact mass will in reality consist of thread ends.

If so desired, the fabric pieces can be fire proofed, or treated with alum, before being compacted to form the hard dense mass. Also if so desired, pieces or plies of asbestos can be distributed throughout the mass or included between some or all of the cloth plies before compression. This dense compact mass of threads forming the brake block, is formed in, or is pressed into while held compressed, any suitable permanent binder. For instance, the permanent binder F, Figs. 6 and 7, can be employed for this purpose and the ends H, can be bent up at the ends of said friction block E. This permanent binder F is formed with overhanging longitudinal side flanges $c$, entering longitudinal grooves $d$, in the opposite longitudinal sides or base portion of the friction block E, although I do not wish to limit myself to any particular construction of binder so far as the broad features of my invention are concerned.

Any suitable construction or formation of brake shoe, casing or holder can be provided to receive the friction block E and its permanent binder, or if so desired, the brake shoe, holder, or casing can itself constitute the permanent binder for the friction block E.

In Figs. 1 to 5, I show a holder composed of two similar longitudinal sections forming a socket having floor A, longitudinal side walls B, end heads K, and a rearwardly extending lug C, having bolt holes $c'$ to receive a bolt $c''$, whereby the brake shoe can be coupled to the brake beam or other structure supporting the same. The two similar longitudinal sections forming this brake shoe or holder can have bolt holes to receive bolts or rivets $a$, for securing the sections together, and the side walls of the sections can also have bolt holes $b$, through which bolts or rivets can extend with said bolts or rivets passing transversely through the friction block E. If so desired, the longitudinal side walls of this holder can be formed with internal longitudinal ribs $c^3$, to enter longitudinal depressions in the opposite sides, such as *d*, in the opposite sides of the friction bolt E. The friction block with a permanent binder such as F can be employed in the holder of Figs. 1 to 5, or the dense compact mass of threads might be formed in the holder so the holder itself might constitute the permanent binder.

In the construction shown by Fig. 8 the brake shoe holder is formed in one piece so far as providing the socket for the friction block is concerned. In this construction the friction block can be removably held in the socket by followers M, clamped against the block ends by bolts L held by lock nuts *k'*, *k''*, the bolts passing through end projections K' integral with the body of the brake shoe or holder.

I have discovered that a dense compact body formed of threads substantially as hereinbefore set forth, and having a wearing surface composed of thread ends is of great utility and advantage for braking purposes, being exceedingly durable and slow to wear and possessing great gripping or friction qualities with a minimum wearing action on the surface contacted thereby, such as a wheel, a brake drum, or other element against which the friction surface is to act.

It is evident that various modifications and variations might be resorted to without departing from the spirit and scope of my invention and hence I do not wish to limit myself to the exact disclosure hereof.

What I claim is:—

1. A brake shoe embodying a holder, said shoe comprising a friction surface exposed for engagement with the opposing body and consisting of a surface of non-metallic thread ends composed of layers of woven fabric compressed together into a hard homogeneous compact mass and a permanent binder therefor, substantially as described.

2. In brake shoes and the like, and in combination therewith, a block consisting of layers of woven non-metallic fabric cut on the bias and compressed into a hard compact mass and having an exposed friction surface composed of thread ends, substantially as described, and a permanent binder holding said block compressed.

In testimony whereof I hereunto affix my signature in the presence of two witnesses.

BRADFORD H. DIVINE.

Witnesses:
ELEANOR T. DE GIORGI,
HENRY M. LOVE.

Copies of this patent may be obtained for five cents each, by addressing the "Commissioner of Patents, Washington, D. C."